Patented Dec. 23, 1941

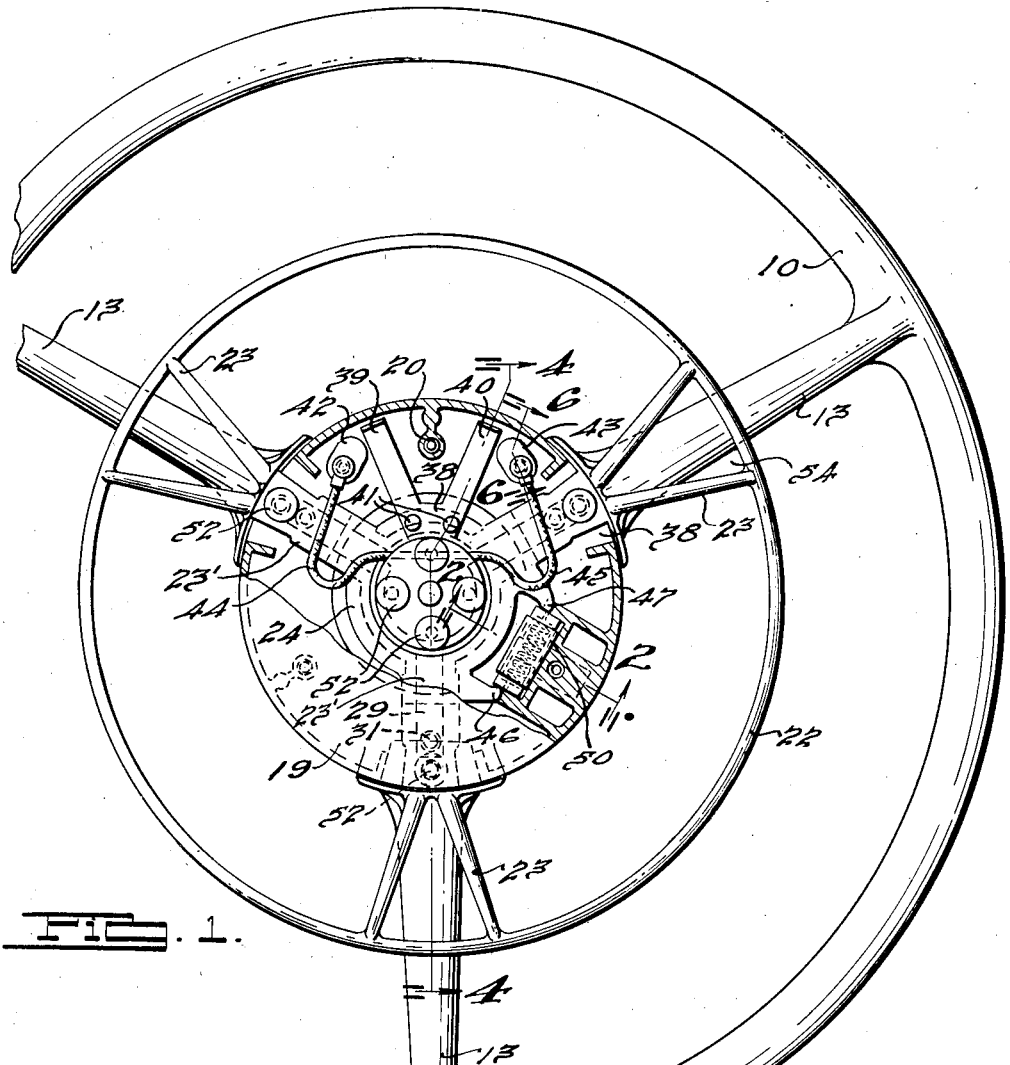
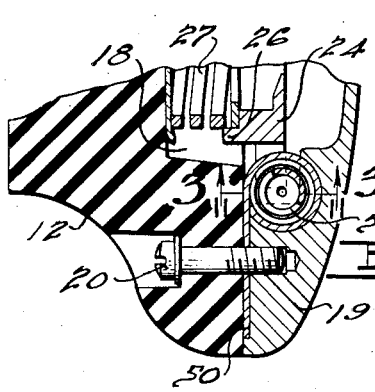
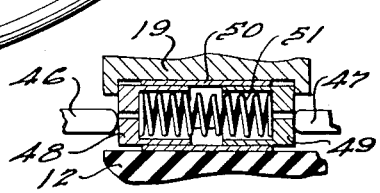

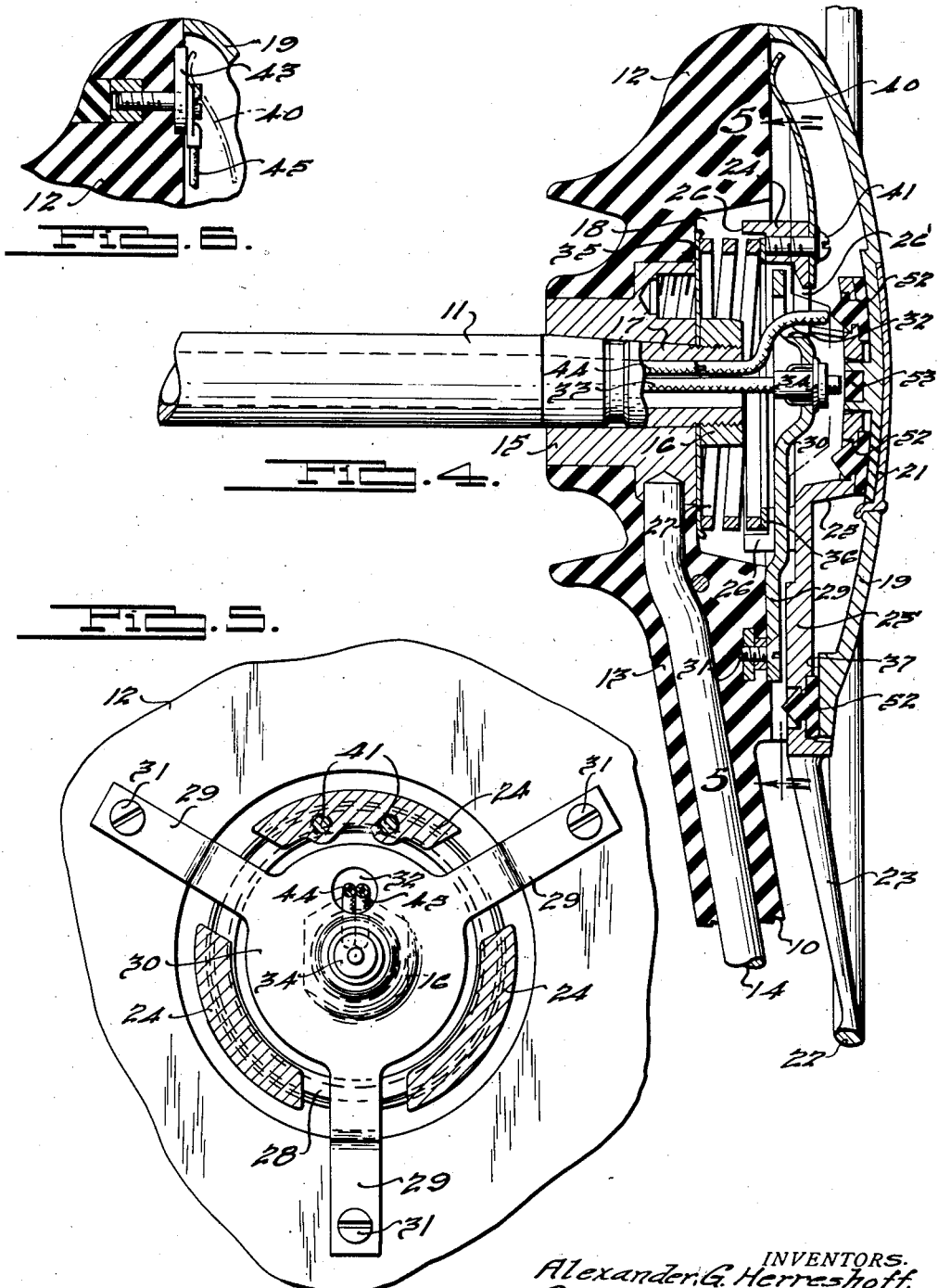

2,267,460

UNITED STATES PATENT OFFICE 2,267,460

STEERING WHEEL SWITCH

Alexander G. Herreshoff, Grosse Pointe, and Gordon R. Pennington, Birmingham, Mich., assignors to Chrysler Corporation, Highland Park, Mich., a corporation of Delaware Application June 2, 1939, Serial No. 277,078

16 Claims. (Cl. 200—59)

This invention relates to electric switches and particularly to switches adapted to be mounted in conjunction with the steering hand wheel of a motor vehicle and the like.

The principal object of our invention is to provide an improved switching device of the type referred to which is adapted to close the horn circuit upon movement about one axis and to close one or more direction signal circuits upon movement about another axis.

An additional object of our invention is to provide a steering wheel mounted switch for controlling a plurality of electric circuits which is simple in construction, employs few parts and will not easily get out of order.

A further object is to provide a direction signal switch incorporating a simple delayed return mechanism which is positive in action and economical to manufacture.

A still further object is to provide in such a device a delayed return mechanism which is easily adjusted and not liable to get out of order.

Other objects will be apparent from the following description and drawings, in which:

Fig. 1 is a fragmentary plan view of a vehicle steering hand wheel, part of the central cover plate being sectioned to show the operating parts of the switch mechanism.

Fig. 2 is a sectional view taken along line 2—2 of Fig. 1.

Fig. 3 is a section along line 3—3 of Fig. 2.

Fig. 4 is a section along line 4—4 of Fig. 1.

Fig. 5 is a section along line 5—5 of Fig. 4.

Fig. 6 is a section along line 6—6 of Fig. 1.

In general, our novel switching device comprises a ring member mounted concentrically with the vehicle steering wheel so that it may readily be actuated by the fingers or thumb of the driver thereof without necessitating the removal of his hands from the wheel. The ring rotates with the wheel and is adapted to be moved clockwise or counterclockwise with respect to the wheel to actuate a signal indicating a right or left turn respectively. In addition, the ring may be rocked about the center thereof to actuate the vehicle horn.

In the embodiment of the invention shown in the drawings, the vehicle steering hand wheel is mounted on the column and has a rim 10 connected to a central hub 12 by a plurality of spokes 13. The wheel is of the usual reinforced plastic construction, the metal reinforcing rods 14 for the spokes 13 being shown in Fig. 4. The rods 14 are connected as illustrated to a central metal casting or forging 15 which serves as the connecting hub of the wheel and column 11. The latter has a reduced threaded portion 17 on which a nut 16 is adapted to be tightened to secure the wheel on the column.

The hub portion 12 has a central hollow recess 18 in which the switch mechanism about to be described is located. This recess is closed upon assembly of the parts by a metal cover 19 secured to the hub 12 by a plurality of bolts 20. The usual medallion 21 is mounted on the cover 19 as indicated in Fig. 4.

The switch operating member is in the form of a ring 22 having spokes 23 connecting the rim thereof to a central hub portion 24. The latter has an upwardly extending portion 25 having openings 26' cut therein to accommodate the direction signal circuit wires as will later be made more apparent. The hub 24 also has a downwardly projecting recessed portion 26 which is adapted to form an upper seat for a coiled compression spring 27. The hub 24 is also provided with cut out portions 28 (Fig. 5) to accommodate the legs 29 of a contact member 30. The latter is secured to the hub 12 by screws 31 and is provided with a punched hole 32 (Figs. 4 and 5) to accommodate the direction signal circuit. The horn circuit wire 33 is connected to the contact member 30 by a suitable connection 34.

The spring 27 is seated at its lower end on a plate 35 of brass or other suitable material, the latter being secured to the metallic hub 15 by the nut 16. As aforesaid, the top of the spring seats in the lower recessed portion 26 of the switch ring hub 24, a washer 36 being provided to assure a good electrical contact.

The spring 27 exerts an upward force against the switch ring hub 24 and thereby resiliently retains the inner portions 23' of the spokes thereof in contact with the underside 37 of the slots 38 provided in the cover 19 and the upwardly projecting portion 25 of the hub 24 in contact with the central inner surface of the cover 19 as shown in Fig. 4. The spring 27 also resiliently retains the legs 29 of contact member 30 out of electrical contact with the inner portions 23' and 24 of the switch ring, and in addition, it grounds the switch ring to the steering column 11.

From the above description, it will be clear that the switch ring 22 is adapted to have movement longitudinally of the column 11 against the force of the spring 27. A very slight movement of the ring 22 against the spring will cause a contact to be established between the legs 29 of member 30 and the portions 23' and 26 of the ring thereby grounding the wire 33 and completing the horn circuit. It will, of course, be understood that in normal operation, it is not necessary to bodily displace the ring 22 downwardly of the column 11 to sound the horn; a slight tipping or rocking movement of the ring 22 by pressure of the driver's finger anywhere on the periphery thereof is all that is necessary.

As can be seen from Figs. 1 and 4, a V-shaped switch element 38 having arms 39 and 40 is secured to the switch ring hub 24 by a pair of screws 41. This switch or contact element is of bronze or other suitable material and is adapted to contact the switch point 42 upon counterclockwise rotation of the ring 22 (as is permitted by slots 38) and to contact the switch point 43 upon clockwise rotation thereof. The switch points 42 and 43 are secured in the hub 12 by suitable fastening means, as illustrated in Fig. 6, and are respectively connected with the wires 44 and 45 which run to the left and right direction indicating signals (not shown). The latter may be lamp signals or of any other suitable type capable of electrical control or actuation.

Referring now to Figs. 1, 2 and 3, it will be seen that the switch ring hub 24 is provided with a pair of ears 46 and 47 which are adapted to contact with the respective piston members 48, 49 carried by a bracket 50 secured between the hub 12 and the cover 19 by one of the cover retaining screws 20.

The bracket 50 has a flat attaching portion and a curved portion which forms a cylinder for reception of the piston members 48 and 49 as illustrated in Figs. 2 and 3. A coiled compression spring 51 urges the piston members apart and into contact with the ears 46, 47. Rotational movement of the ring 22 in either direction will compress the spring 51 which upon release of the ring will return the same to the central position.

In order to prevent the ring 22 from being returned to its central position too quickly after a signal for a turn has been given, a delay means is provided. This delay means is in the form of a plurality of yieldable buttons 52 of rubber or other suitable material. In the specific modification of the invention illustrated, four of these buttons are located in the upwardly extended hub 25 of the ring 22 and one is positioned in each of the inner spoke portions 23' thereof. These buttons are intended to be slightly compressed by the cover 19 when the bolts 20 are tightened and will therefore offer frictional resistance to rotation of the ring 22 relative to the cover 19 and hub 12.

An additional rubber member 53 is provided in the cover 19 directly above the terminal 34 to prevent accidental sounding of the horn when signalling.

In assembling the mechanism, the spring 51 is chosen of a force sufficient to move the ring 22 back to neutral or central position in approximately ten seconds against the frictional resistance of the buttons 52 after a signal has been given. This increment of time is deemed sufficient to satisfy the requirements of ordinary traffic conditions. A greater delay may be provided if desired by providing additional buttons, or by increasing the compression thereof, or by providing serrations in the friction surfaces of the buttons. It is preferred to make the buttons of rubber compounded to have a relatively slow recovery from deformation, thus providing a slow return to neutral of the ring 22.

As can be seen from Fig. 1, the switch points 42, 43 are elongated in the direction of movement of the switch arms 39, 40 so that the contact between the point and arm will be maintained throughout a substantial part of the movement of the ring 22.

The spokes 23 of the switch ring 22 are of V-shape as indicated in Fig. 1. This shape, or one similar thereto, has been found advantageous in installations of this general type for the reason that the driver can insert a finger or thumb in the opening 54 between the arms of the V in one of the spokes and rotate the ring 22 in either direction against the force of the spring 51 and the frictional resistance of the buttons 52 with a sure and positive action and without the necessity of removing the hand from the steering wheel rim 10.

It is believed that the operation of the direction signal switch will be obvious from the above description and it will be noted that the horn switch is operative at all times regardless of the rotative position of the ring 22.

While the invention has been described with particular reference to a horn and direction signal, it is not intended to thus limit the invention in its broader aspects. Various other devices such as, for instance, the headlight tilting or dimming mechanism might be operated by the novel switch described herein.

Numerous other modifications of the invention will be apparent to those skilled in the art from the teaching herein and it is not intended to limit the spirit or scope thereof except as set forth in the claims appended below.

We claim:

1. In an electric switch device adapted for mounting within a vehicle steering wheel hub, a plurality of contact elements fixed relative to said hub; a movable contact structure carried by said hub and mounted for axial and rotational movement relative thereto; said movable contact structure having a control portion projecting outwardly of said hub for contact with the fingers of the driver; said movable contact structure being adapted upon axial movement relative to said hub to engage one of said elements, upon clockwise rotation to engage another of said elements, and upon counterclockwise rotation to engage still another of said elements; and yieldable means acting to urge said movable contact structure out of engagement with said respective elements.

2. In an electric switch device adapted for mounting within a vehicle steering wheel hub, a plurality of contact elements fixed relative to said hub; a movable contact structure carried by said hub and mounted for axial and rotational movement relative thereto; said movable contact structure having a control portion projecting outwardly of said hub for contact with the fingers of the driver; said movable contact structure being adapted upon axial movement relative to said hub to engage one of said elements, upon clockwise rotation to engage another of said elements, and upon counterclockwise rotation to engage still another of said elements; means energized by rotation of said contact structure for yieldably resisting rotation thereof and for returning the same to normal position and means for frictionally retarding the operation of said last means.

3. In an electric switch device adapted for mounting within a vehicle steering wheel hub, a plurality of contact elements fixed relative to said hub; a movable contact structure carried by said hub and mounted for axial and rotational movement relative thereto; said movable contact structure having a control portion projecting outwardly of said hub for contact with the fingers of the driver; said movable contact structure being adapted upon axial movement relative to said hub to engage one of said elements, upon clockwise rotation to engage another of said elements, and upon counterclockwise rotation to engage still another of said elements; spring actuated means for urging said movable contact structure out of engagement with said elements and means for controlling the rotational speed of said movable contact member under the influence of said spring actuated means comprising a friction element operatively associated with said movable contact member and said hub.

4. In combination with a vehicle steering wheel having a metallic hub portion mounted on a steering column and a hub portion of insulating material surrounding said metallic hub portion, a fixed contact element carried by said insulating portion; a cover fixedly secured to said hub; a movable contact member having a finger engageable portion extending outwardly of said cover and an inner portion adapted for engagement with said fixed contact element; a spring disposed in said hub in electrical contact with said metallic portion and movable contact member and acting to normally maintain said contact member out of engagement with said contact element, and an electrical connection between said fixed contact element and a device to be energized.

5. In combination with a vehicle steering wheel having a metallic hub portion secured to a steering column and an insulating hub portion surrounding said metallic portion, a fixed contact element carried by said insulating portion; a cover carried by said hub; a movable contact member having a finger engageable portion extending outwardly of said hub and an inner portion disposed beneath said cover, said member being electrically connected to said metallic hub portion; means carried by said member for establishing an electrical connection between said member and said element upon rotation of said member relative to said hub, and means electrically connecting said element with a device to be energized.

6. In combination with a vehicle steering wheel having a metallic hub portion secured to a steering column and an insulating hub portion surrounding said metallic portion, a fixed contact element carried by said insulating portion; a cover carried by said hub; a movable contact structure having a finger engageable portion extending outwardly of said hub and an inner portion disposed beneath said cover, said structure being electrically connected to said metallic hub portion; means carried by said structure for establishing an electrical connection between said structure and said element upon rotation of said member relative to said hub; means for yieldably urging said member out of contact with said element and means for frictionally resisting rotation of said member.

7. In combination with a vehicle steering wheel having a metallic hub portion secured to a steering column and an insulating hub portion surrounding said metallic portion, a fixed contact element carried by said insulating portion; a cover carried by said hub; a movable contact member having a finger engageable portion extending outwardly of said hub and an inner portion disposed beneath said cover, said member being electrically connected to said metallic hub portion; means carried by said member for establishing an electrical connection between said member and said element upon rotation of said member relative to said hub; means for yieldably urging said member out of contact with said element and means for frictionally resisting rotation of said member, said last means comprising a friction element carried by said member in frictional contact with said cover.

8. In combination with a vehicle steering wheel having a metallic hub portion secured to a steering column and an insulating hub portion surrounding said metallic portion, a fixed contact element carried by said insulating portion; a cover carried by said hub; a movable contact member having a finger engageable portions extending outwardly of said hub and an inner portion disposed beneath said cover, said member being electrically connected to said metallic hub portion; means carried by said member for establishing an electrical connection between said member and said element upon rotation of said member relative to said hub; means for yieldably urging said member out of contact with said element and means for frictionally resisting rotation of said member, said last means comprising a friction element carried by said member beneath said cover and means for urging said member against said cover.

9. In an electric switch device adapted for mounting within a vehicle steering wheel hub, an axially and circumferentially movable switch member having a finger engageable portion extending outwardly of said hub; means for yieldably maintaining said member in predetermined position axially of said hub; means for yieldably maintaining said member in predetermined position circumferentially of said hub, said last means acting also to return said member to said predetermined position after circumferential movement thereof.

10. In an electric switch device adapted for mounting within a vehicle steering wheel hub, an axially and circumferentially movable switch member having a finger engageable portion extending outwardly of said hub; means for yieldably maintaining said member in predetermined position axially of said hub; means for yieldably maintaining said member in predetermined position circumferentially of said hub, said last means acting also to return said member to said predetermined position after circumferential movement thereof, and means for yieldably resisting said return movement.

11. In an electric switch device adapted for mounting within a vehicle steering wheel hub, an axially and circumferentially movable switch member having a finger engageable portion extending outwardly of said hub; means for yieldably maintaining said member in predetermined position axially of said hub; means for yieldably maintaining said member in predetermined position circumferentially of said hub, said last means acting also to return said member to said predetermined position after circumferential movement thereof, and means for producing a substantially slow return movement under the action of said last means.

12. In an electric switch device adapted for mounting within a vehicle steering wheel hub, an axially and circumferentially movable switch member having a finger engageable portion extending outwardly of said hub; means for yieldably maintaining said member in predetermined position axially of said hub; means for yieldably maintaining said member in predetermined position circumferentially of said hub, said last means acting also to return said member to said predetermined position after circumferential movement thereof, and friction means operatively associated with said movable member for substantially delaying the completion of said return movement.

13. In combination with a vehicle steering wheel having a hub for attachment to a steering column, a recess in said hub; a cover for said recess; a plurality of radial slots in said cover; an electrical switch operating member disposed beneath said cover and having finger engageable portions extending outwardly thereof through said slots; said outwardly extending portions being smaller than said slots whereby said member is adapted to be moved both axially and circumferentially of said hub; means for rigidly securing said cover to said hub; means for yieldably urging said outwardly extending portions of said member axially against one wall of said slots and means for yieldably maintaining said portions in substantial mid-position circumferentially of said slots.

14. In combination with a vehicle steering wheel having a hub for attachment to a steering column, a recess in said hub; a cover for said recess; a plurality of radial slots in said cover; an electrical switch operating member disposed beneath said cover and having finger engageable portions extending outwardly thereof through said slots; said outwardly extending portions being smaller than said slots whereby said member is adapted to be moved both axially and circumferentially of said hub; means for rigidly securing said cover to said hub; means for yieldably urging said outwardly extending portions of said member axially against one wall of said slots and means for yieldably maintaining said portions in substantial mid-position circumferentially of said slots, said yieldable means and said cover constituting the sole mounting means for said member.

15. In combination with a vehicle steering wheel having a centrally recessed hub portion, an electric switch device disposed in said recessed hub portion; a switch operating member having a finger engageable portion extending outwardly of said hub and adapted for reciprocable circuit closing movement about the axis of said hub; a pair of opposed pistons carried in said hub; means yieldably urging said pistons apart, and a pair of ears on said operating member in engagement with said pistons respectively.

16. In combination with a vehicle steering wheel having a centrally recessed hub portion, an electric switch device disposed in said recessed hub portion; a switch operating member having a finger engageable portion extending outwardly of said hub and adapted for reciprocable circuit closing movement about the axis of said hub; means for providing a slow return of said operating member to neutral position after circuit closing movement thereof comprising resilient means for urging said member into neutral position and friction means for yieldably opposing the action of said resilient means.

ALEXANDER G. HERRESHOFF.
GORDON R. PENNINGTON.